United States Patent
Mobley et al.

(10) Patent No.: US 11,691,105 B2
(45) Date of Patent: Jul. 4, 2023

(54) ROTATING PACKED BEDS WITH INTERNAL HEAT TRANSFER FOR ABSORPTION/REGENERATION APPLICATIONS

(71) Applicant: RESEARCH TRIANGLE INSTITUTE, Research Triangle Park, NC (US)

(72) Inventors: Paul David Mobley, Raleigh, NC (US); Shaojun James Zhou, Cary, NC (US)

(73) Assignee: RESEARCH TRIANGLE INSTITUTE, Research Triangle Park, NC (US)

(*) Notice: Subject to any disclaimer, the term of this patent is extended or adjusted under 35 U.S.C. 154(b) by 537 days.

(21) Appl. No.: 16/792,246

(22) Filed: Feb. 16, 2020

(65) Prior Publication Data

US 2020/0261846 A1    Aug. 20, 2020

Related U.S. Application Data

(60) Provisional application No. 62/807,173, filed on Feb. 18, 2019.

(51) Int. Cl.
  *B01D 53/78*    (2006.01)
  *B01D 53/96*    (2006.01)
  (Continued)

(52) U.S. Cl.
  CPC .............. *B01D 53/78* (2013.01); *B01D 53/62* (2013.01); *B01D 53/84* (2013.01); *B01D 53/96* (2013.01);
  (Continued)

(58) Field of Classification Search
  None
  See application file for complete search history.

(56) References Cited

U.S. PATENT DOCUMENTS 9,216,377 B1 * 12/2015 Dutra E Mello ......... C07C 7/11
2012/0061614 A1 * 3/2012 Calabro ................ B01D 53/62
                                                            423/229

OTHER PUBLICATIONS

Bostick, D., et al., "Slipstream Pilot-Scale Demonstration of a Novel Amine-Based Post-Combustion Technology for Carbon Dioxide Capture From Coal-Fired Power Plant Flue Gas", "Final Techno-Economic Analysis Report—DE-FE0007453", Jan. 9, 2017, pp. 1-58.

(Continued)

*Primary Examiner* — Daniel Berns
(74) *Attorney, Agent, or Firm* — Hultquist, PLLC; Steven J. Hultquist (57) ABSTRACT

A gas-liquid contacting apparatus and method are described, in which at least one rotor assembly including packing is arranged in a contacting chamber containing at least one stator assembly including at least one heat exchanger arranged to thermally modulate the gas-liquid contacting so that each stator assembly is operatively arranged with each stator assembly to provide gas-liquid contacting at temperatures effective for mass exchange between the gas and liquid. The rotor and stator assemblies may be of annular shape, or may be of disk shape in a stacked array of rotor assemblies alternating with stator assemblies. Such apparatus and method are usefully employed for $CO_2$ capture from $CO_2$-containing flue gases such as combustion effluents from power generation plants.

18 Claims, 5 Drawing Sheets
(4 of 5 Drawing Sheet(s) Filed in Color)

(51) Int. Cl.
*B01D 53/62* (2006.01)
*B01D 53/84* (2006.01)

(52) U.S. Cl.
CPC .... *B01D 2251/608* (2013.01); *B01D 2251/80* (2013.01); *B01D 2252/204* (2013.01); *B01D 2252/30* (2013.01); *B01D 2252/602* (2013.01); *B01D 2257/504* (2013.01); *B01D 2258/0283* (2013.01)

(56) References Cited

OTHER PUBLICATIONS

Fout, T., et al., "Cost and Performance Baseline for Fossil Energy Plants: vol. 1a: Bituminous Coal (PC) and Natural Gas to Electricity Revision 3", "Cost and Performance Baseline for Fossil Energy Plants", Jul. 6, 2015, pp. 1-240, vol. 1, No. Revision 3.

Garcia, G., et al., "A Review on Process Intensification in HiGee Distillation", "J. Chem. Technol. Biotechnol.", 2017, pp. 1136-1156, vol. 92.

Li, Y., et al., "A Study on the Absorption of Ammonia Into Water in a Rotor-Stator Reactor", "The Canadian Journal of Chemical Engineering", Jan. 2015, pp. 116-120, vol. 93.

Oko, E., et al., "Study of Absorber Intercooling in Solvent-Based CO2 Capture Based on Rotating Packed Bed Technology", "Energy Procedia", 2017, pp. 3511-3516, vol. 142.

Oko, E., et al., "Study of Intercooling for Rotating Packed Bed Absorbers in Intensified Solvent-Based CO2 Capture Process", "Applied Energy", 2018, pp. 302-316, vol. 223.

Wang, M., et al., "Process Intensification for Post-Combustion CO2 Capture With Chemical Absorption: A Critical Review", "Applied Energy", 2015, pp. 275-291, vol. 158.

Yu, C., et al., "A Review of CO2 Capture by Absorption and Adsorption", "Aerosol and Air Quality Research", 2012, pp. 745-769, vol. 12.

\* cited by examiner

ROTATING PACKED BEDS WITH INTERNAL HEAT TRANSFER FOR ABSORPTION/REGENERATION APPLICATIONS

CROSS-REFERENCE TO RELATED APPLICATION

The benefit under 35 USC § 119 of U.S. Provisional Patent Application 62/807,173 filed Feb. 18, 2019 in the names of Paul David Mobley and Shaojun James Zhou for "ROTATING PACKED BEDS WITH INTERNAL HEAT TRANSFER FOR ABSORPTION/REGENERATION APPLICATIONS" is hereby claimed. The disclosure of U.S. Provisional Patent Application 62/807,173 is hereby incorporated herein by reference, in its entirety, for all purposes.

FIELD

The present disclosure relates generally to apparatus and method for gas-liquid contacting, for applications such as removal of gas phase component(s) by absorption by a scrubbing liquid, and in a specific aspect to apparatus and method for capture of carbon dioxide from gas streams containing same, e.g., combustion effluent gas streams such as $CO_2$-containing flue gas streams discharged from combustion process power plants.

DESCRIPTION OF THE RELATED ART

Carbon dioxide ($CO_2$) is generated in a wide variety of combustion processes. $CO_2$ is a greenhouse gas that absorbs and emits radiant energy in the thermal infrared range, and therefore is desirably captured at the site of combustion processes where it is generated.

Currently, the most mature technology for effecting post-combustion $CO_2$ capture (PCC) is treatment of the combustion process effluent by absorption using aqueous amine-based solvent compositions. In such processes, a $CO_2$-containing flue gas from a combustion process is flowed into an absorption contacting vessel in which the flue gas is contacted with the aqueous amine-based solvent composition to at least partially remove $CO_2$ from the flue gas and produce a $CO_2$-depleted effluent gas discharge from the vessel. The resulting $CO_2$-enriched solvent composition is discharged from the vessel and flowed to a solvent regeneration vessel in which elevated temperature conditions are utilized to release $CO_2$ from the solvent composition. The released $CO_2$ product gas then is discharged from the regeneration vessel and processed for storage and/or use, with the regenerated $CO_2$-depleted solvent composition being recirculated to the contacting vessel.

PCC treatment systems of such type are associated with high capital and operating expenses that have constrained their widespread implementation, and most research in the past decade has focused on reducing energy requirements for regeneration of capture solvents utilized for $CO_2$ removal to ameliorate these deficiencies.

The art continues to seek new and cost-effective PCC treatment solutions for capturing $CO_2$ from $CO_2$-containing combustion effluent gases.

SUMMARY

The present disclosure relates to apparatus and method for gas-liquid contacting, e.g., for treatment of gas streams by liquid scrubbing to remove gaseous component(s) therefrom.

In one aspect, the disclosure relates to a rotating packed bed apparatus for gas-liquid contacting, comprising:
a housing;
at least one stator assembly mounted in the housing, comprising at least one heat exchanger arranged to thermally modulate the gas-liquid contacting;
at least one rotor assembly mounted in the housing for rotation therein, comprising packing supporting the gas-liquid contacting;
a gas inlet through which an influent gas can enter an interior volume of the housing for the gas-liquid contacting therein;
a gas outlet through which an effluent gas can flow out of the interior volume of the housing after the gas-liquid contacting therein;
a liquid inlet through which an influent liquid can enter the interior volume of the housing for the gas-liquid contacting therein; and
a liquid outlet through which an effluent liquid can flow out of the interior volume of the housing after the gas-liquid contacting therein.

In another aspect, the disclosure relates to an installation comprising multiple ones of such rotating packed bed apparatus interconnected with one another, wherein a first one of such apparatus is deployed for scrubbing of influent gas to remove one or more components thereof, and a second one of such apparatus receives the effluent scrubbing liquid containing the one or more components from the first one of such apparatus, and regenerates the liquid to remove the absorbed one or more components therefrom.

In a further aspect, the disclosure relates to a method of contacting gas with liquid for mass transfer therebetween, said method comprising introducing the gas and liquid into a contacting zone containing at least one rotating mass of packing and at least one stationary heat exchanger, wherein each rotating mass of packing is adjacent to at least one stationary heat exchanger, discharging contacted liquid from the contacting zone, and discharging contacted gas from the contacting zone.

Another aspect of the disclosure relates to a method as described above, further comprising processing the contacted liquid discharged from the contacting zone to release therefrom one or more components deriving from the gas introduced to the contacting zone, and absorbed by the liquid in the gas-liquid contacting. Such processing in another aspect may comprise introducing the contacted liquid into a second contacting zone, to which second gas is introduced, said second contacting zone containing at least one rotating mass of packing and at least one stationary heat exchanger, wherein each rotating mass of packing is adjacent to at least one stationary heat exchanger in the second contacting zone, discharging further-contacted liquid from the second contacting zone, and discharging contacted second gas, containing said one or more components, from the second contacting zone.

A further aspect of the disclosure relates to a rotating packed bed apparatus for gas-liquid contacting, comprising:
a housing;
at least one stator assembly mounted in the housing, comprising at least one heat exchanger arranged to thermally modulate the gas-liquid contacting;
at least one rotor assembly mounted in the housing for rotation therein, comprising packing supporting the gas-liquid contacting; and
fluid flow passages coupled with the housing to deliver fluid into the housing for the gas-liquid contacting and discharge contacted gas and contacted liquid from the housing An additional aspect of the disclosure relates to a method of contacting gas with liquid for mass transfer therebetween, said method comprising introducing the liquid into a contacting zone containing at least one rotating mass of packing and at least one stationary heat exchanger, wherein each rotating mass of packing is adjacent to at least one stationary heat exchanger, contacting the introduced liquid with gas in the contacting zone, discharging contacted liquid from the contacting zone, and discharging contacted gas from the contacting zone.

Other aspects, features and embodiments of the disclosure will be more fully apparent from the ensuing description and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present disclosure relates to gas-liquid contacting apparatus and method that may be advantageously employed for a wide variety of gas-liquid contacting applications, and which may for example be employed to effect $CO_2$ capture from $CO_2$-containing gas streams such as those generated by combustion processes in power generation plants.

In one aspect, the present disclosure contemplates a rotating packed bed apparatus for gas-liquid contacting, comprising: a housing; at least one stator assembly mounted in the housing, comprising at least one heat exchanger arranged to thermally modulate the gas-liquid contacting; at least one rotor assembly mounted in the housing for rotation therein, comprising packing supporting the gas-liquid contacting; a gas inlet through which an influent gas can enter an interior volume of the housing for the gas-liquid contacting therein; a gas outlet through which an effluent gas can flow out of the interior volume of the housing after the gas-liquid contacting therein; a liquid inlet through which an influent liquid can enter the interior volume of the housing for the gas-liquid contacting therein; and a liquid outlet through which an effluent liquid can flow out of the interior volume of the housing after the gas-liquid contacting therein.

In such rotating packed bed apparatus, various arrangements of the stator and rotor assemblies are possible, including arrangements in which (i) each of the at least one stator assembly and each of the at least one rotor assembly is of annular shape, or (ii) each of the at least one stator assembly and each of the at least one rotor assembly is of disk shape.

The housing of the apparatus in various embodiments may comprise a cylindrical outer wall circumferentially surrounding (i) an outermost one of the stator and rotor assemblies, when each of the stator and rotor assemblies is of annular shape, or (ii) outermost edges of the at least one stator and rotor assemblies, when the stator and rotor assemblies are of disk shape and arranged in a stacked arrangement.

The rotating packed bed apparatus of the present disclosure may comprise one or multiple rotor assemblies. For example, the rotating packed bed apparatus may comprise multiple rotor assemblies, in any suitable arrangement, e.g., with one stator assembly or multiple stator assemblies. As an illustration, the rotating packed bed apparatus may comprise two rotor assemblies, with one stator assembly mounted intermediate the respective ones of the two rotor assemblies. The rotating packed bed apparatus may be widely varied in respect of the number and conformation of rotor and stator assemblies. The apparatus may for example comprise multiple stator assemblies, such as in an apparatus comprising multiple stator assemblies and multiple rotor assemblies, in alternating arrangement with respect to one another.

In one embodiment of the rotating packed bed apparatus is broadly described above, the at least one heat exchanger may comprise heat transfer flow circuitry configured for coupling with a source of heating or cooling fluid, to enable flow of the heating or cooling fluid through the heat transfer flow circuitry in operation of the rotating packed bed apparatus. The heat transfer flow circuitry may comprise any of suitable lines, conduits, piping, valving, fittings, monitoring and control components, etc. as necessary or desirable in a given implementation of the apparatus. The heat transfer flow circuitry may be coupled with a source of heating or cooling fluid, such as a supply vessel, pipeline, or other suitable source. The heating or cooling fluid may be of any suitable type and may for example include heat exchange fluid such as water, steam, oil, ethylene glycol, propylene glycol and compatible mixtures of two or more of the foregoing.

The rotating packed bed apparatus may be varied in configuration, with respect to the respective inlets and outlets. As an example, the liquid inlet may be arranged so that influent liquid enters the interior volume of the housing at a central region of the housing. Additionally, or alternatively, the rotating packed bed may be configured with the gas outlet arranged so that effluent gas flows out of the interior volume of the housing at a central region of the housing. Thus, the liquid inlet and the gas outlet may be arranged so that influent liquid enters the interior volume of the housing, and effluent gas flows out of the interior volume of the housing, at a central region of the housing, with the liquid inlet and the gas outlet being in spaced-apart relationship to one another. In other embodiments, the configuration of the rotating packed bed apparatus may include arrangements in which the liquid inlet and gas inlet are arranged to introduce influent liquid and influent gas at a central region of the housing, in a co-current flow arrangement. In still other embodiments, the configuration of the rotating packed bed apparatus may include arrangements in which the liquid and gas inlets and outlets are arranged so that the gas flows axially through the rotating packed bed interior volume and the liquid flows transversely across the interior volume, in a cross-flow arrangement. In general, it will be recognized that any suitable positions and arrangements of the gas and liquid inlets and outlets may be employed in the rotating packed bed apparatus of the present disclosure, as effective to achieve the desired gas-liquid contacting in the operation of such apparatus.

The liquid inlet of the rotating packed bed apparatus may be coupled with a source of influent liquid of any suitable type. The source may comprise a container or vessel of the influent liquid, from which the liquid is flowed to the rotating packed bed apparatus, or the source may be a feedline or conduit supplying the influent liquid from another process system or apparatus.

The rotating packed bed apparatus of the present disclosure may be utilized for a variety of gas-liquid contacting operations. In various embodiments, the apparatus is utilized to capture $CO_2$ from $CO_2$-containing gases such as combustion process effluents, e.g., from power generation plants in which coal, natural gas, hydrocarbon liquids, or other fuel is utilized as a feedstock for combustion to produce heat for steam generation to drive turbines providing electrical energy to power grids.

For such applications, the source of the influent liquid may comprise influent liquid that is effective as a scrubbing medium in the gas-liquid contacting operation conducted in the rotating packed bed apparatus to achieve desired levels of $CO_2$ abatement in the processing of the $CO_2$-containing effluent gas.

The influent liquid may be of any suitable type and may for example comprise a solvent that is effective for absorbing carbon dioxide ($CO_2$) from a $CO_2$-containing influent gas, such as a gas resulting from a combustion process, such as flue gas from an electrical power generation plant. Such solvent may be a single component solvent or a multicomponent solvent, as may be efficacious in a specific end-use application of the rotating packed bed apparatus and method of the present disclosure.

Illustrative solvents that may be utilized in the rotating packed bed apparatus and method of the present disclosure include any of the solvent compositions disclosed in International Publications WO2012/031274 (PCT/US2011/050442, Regenerable Ionic Liquid Solvent for Acid-Gas Separation), WO2012/031281 (PCT/US2011/050452, Regenerable Solvent Mixtures with Nitrogenous Base for Acid-Gas Separation), and WO 2013/130997 (PCT/US2013/028660, Regenerable Solvent Mixtures for Acid-Gas Separation), disclosures of which are hereby incorporated herein by reference.

The influent liquid in various embodiments may comprise an ionic liquid formed from the conjugate base of an acidic component having a pKa of less than about 15, such as a fluorinated alcohol, optionally substituted phenol, nitrogen heterocycle, or mixture thereof, and the conjugate acid of a nitrogenous base, e.g., an amidine and/or guanidine.

In other embodiments, the influent liquid may comprise a solution of a nitrogenous base having a nitrogen with a hydrogen atom leaving group, and a diluent, in which the nitrogenous base is reactive with an acidic gas to form a carbamate salt or a heteroatom analog of a carbamate salt, without substantial formation of a carbonate ester or a heteroatom analog of a carbonate ester. The diluent may for example be selected from any of alcohols, ketones, aliphatic hydrocarbons, aromatic hydrocarbons, nitrogen heterocycles, oxygen heterocycles, aliphatic ethers, cyclic ethers, esters, and amides and mixtures thereof, and the nitrogenous base may for example be selected from any of primary amines, secondary amines, diamines, triamines, tetraamines, pentamines, cyclic amines, cyclic diamines, amine oligomers, polyamines, alcoholamines, guanidines, amidines, and mixtures thereof.

In still other embodiments, the influent liquid may comprise a solution of an ionic liquid consisting of a nucleophilic amine and a protic, non-aqueous liquid, in which the ionic liquid reacts with an acidic gas so as to form an ionic solution comprising: 1) a carbamate salt, Zwitterionic sulfamic acid, sulfate salt, or a combination thereof; and 2) a protonated weak acid. In such solution, the nucleophilic amine may for example be a primary amine, a secondary amine, a diamine, a triamine, a tetraamine, a pentamine, a cyclic amine, a cyclic diamine, an amine oligomer, a polyamine, an alcoholamine, or a mixture of two or more of the foregoing, and the protic non-aqueous liquid may be a fluorinated alcohol, an optionally substituted phenol; a nitrogen heterocycle, or a mixture of two or more of the foregoing.

In additional embodiments, aqueous amine liquid compositions may be employed as the influent liquid.

It will be recognized that the specific influent liquid composition that is utilized in a given application of the rotating packed bed apparatus and method of the present disclosure will depend on the influent gas that is to be contacted in the gas-liquid contacting operation, as to its temperature, pressure, flow rate, composition, and other characteristics, and accordingly, the influent liquid may be of widely varied character, with regard to liquid type, composition, etc., with specific influent liquids being selected within the level of knowledge and skill in the art, based on the disclosure herein and the specific application being implemented.

The packing that is employed in the rotor assemblies of the rotating packed bed apparatus may be of any suitable type and may for example comprise random packing or structured packing, e.g., rings, grids, meshes, foams, blades, saddles, or other geometrically regular or irregular shapes, in any suitable materials of construction, including, for example, metal, glass, clay, ceramic, plastic, and composite materials.

The rotating packed bed apparatus of the disclosure, as variously described above, may be arranged in a rotating packed bed installation comprising a first rotating packed bed apparatus as a first process unit of the installation, and comprising a corresponding second rotating packed bed apparatus as a second process unit of the installation, in which the first process unit rotating packed bed apparatus is coupled in fluid transfer relationship with the second process unit rotating packed bed apparatus. Various arrangements are possible. For example, a series arrangement of respective rotating packed bed apparatus units of the present disclosure may be deployed, in which effluent liquid from the first rotating packed bed apparatus unit is the influent liquid to the second rotating packed bed apparatus unit, and the effluent gas from the second rotating packed bed apparatus unit is an influent gas to the first rotating packed bed apparatus unit. Arrangements are also contemplated, which involve heat exchange between influent and/or effluent fluid streams of the respective units, e.g., liquid streams of the respective units, gas streams of the respective units, or a liquid stream of one unit and a gas stream of another unit, as well as arrangements in which gas and liquid streams of a single rotating packed bed apparatus unit are in heat exchange relationship with one another, to effect fluid heating, cooling, energy recovery, etc. It will also be appreciated that any of the liquid and/or gas streams associated with the rotating packed bed apparatus or assemblies of multiple such apparatus may be heated or cooled in a heat exchanger with suitable heating or cooling fluid from any suitable source.

For example, in a rotating packed bed installation of such type, the liquid outlet of the first process unit rotating packed bed apparatus may be coupled with the liquid inlet of the second process unit rotating packed bed apparatus in the aforementioned fluid transfer relationship, with the rotating packed bed installation configured so that the gas-liquid contacting is conducted in the first process unit rotating packed bed apparatus for absorption of a component of the influent gas in the influent liquid in the interior volume of the housing thereof. In this arrangement, the gas-liquid contacting is conducted in the second process unit rotating packed bed apparatus for regeneration of the effluent liquid that is transferred from the liquid outlet of the first process unit rotating packed bed apparatus in such fluid transfer relationship to the liquid inlet of the second process unit rotating packed bed apparatus as the influent liquid for the second process unit rotating packed bed apparatus. By this arrangement, effluent gas enriched in the aforementioned component is produced for discharge from the gas outlet of the second process unit rotating packed bed apparatus. In various embodiments, other process units may be operatively associated with the first and second process units. For example, such other process units may be selected from the group consisting of (i) heat exchange units arranged for heat exchange of liquid streams flowed to and/or from rotating packed bed apparatus in the rotating packed bed installation, and (ii) additional rotating packed bed apparatus process unit(s) arranged in series with said first process unit rotating packed bed apparatus and/or said second process unit rotating packed bed apparatus. It will be recognized that a wide variety of specific arrangements is possible, within the scope of the present disclosure.

The disclosure contemplates arrangements in which the rotating packed bed apparatus of the disclosure is provided, with the gas inlet being coupled in gas-receiving relationship to a source of flue gas from a power generating plant. In such arrangement, the liquid inlet of the apparatus is coupled in liquid-receiving relationship to a source of $CO_2$-scrubbing influent liquid, which may for example comprise a scrubbing liquid of a type as hereinabove described.

In another aspect, the disclosure contemplates a method of contacting gas with liquid for mass transfer therebetween, such method comprising introducing the gas and liquid into a contacting zone containing at least one rotating mass of packing and at least one stationary heat exchanger, wherein each rotating mass of packing is adjacent to at least one stationary heat exchanger, discharging contacted liquid from the contacting zone, and discharging contacted gas from the contacting zone.

Such method may be performed, in which each rotating mass of packing and each heat exchanger is of annular shape, or each of the rotating mass of packing and each heat exchanger is of disk shape. The contacting zone in such method may be bounded by a cylindrical outer wall circumferentially surrounding (i) an outermost one of the at least one rotating mass of packing and at least one stationary heat exchanger, when each of the at least one rotating mass of packing and at least one stationary heat exchanger is of annular shape, or (ii) outermost edges of the at least one rotating mass of packing and at least one stationary heat exchanger, when each of the at least one rotating mass of packing and at least one stationary heat exchanger is of disk shape and arranged in a stacked arrangement.

Consistent with the preceding description of the apparatus of the disclosure, the method described above may be carried out with the contacting zone containing multiple rotating masses of packing. The contacting zone in such case may contain one stationary heat exchanger, e.g., arranged with the contacting zone containing two rotating masses of packing, with the stationary heat exchanger being stationarily positioned between them. Alternatively, the contacting zone may contain multiple stationary heat exchangers, with one or more than one rotating masses of packing.

In various implementations, the contacting zone may contain multiple rotating masses of packing and multiple stationary heat exchangers, in alternating arrangement with respect to one another. In the heat exchange arrangement of the gas-liquid contacting method, the at least one stationary heat exchanger may effect heating for the gas-liquid contacting, or alternatively it may effect cooling for the gas-liquid contacting.

Consistent with the earlier discussion herein, the liquid may be introduced into the contacting zone at a central region thereof, and/or the contacted gas may be discharged from the contacting zone at a central region thereof. When the liquid is introduced into the contacting zone, and the contacted gas is discharged from the contacting zone, at a central region of the contacting zone, the liquid introduction and gas discharge are desirably spaced apart from one another to preclude any unwanted interaction between such fluid streams.

The disclosure in a further aspect relates to a rotating packed bed apparatus for gas-liquid contacting, comprising:
a housing;
at least one stator assembly mounted in the housing, comprising at least one heat exchanger arranged to thermally modulate the gas-liquid contacting;
at least one rotor assembly mounted in the housing for rotation therein, comprising packing supporting the gas-liquid contacting; and
fluid flow passages coupled with the housing to deliver fluid into the housing for the gas-liquid contacting and discharge contacted gas and contacted liquid from the housing.

The fluid flow passages in such rotating packed bed apparatus in various embodiments may comprise a liquid inlet through which an influent liquid can enter into the housing for the gas-liquid contacting therein; a liquid outlet through which an effluent liquid can flow out of the housing after the gas-liquid contacting therein; and a gas outlet through which an effluent gas can flow out of the housing after the gas-liquid contacting therein. The apparatus may be configured without a gas inlet for introducing liquid for the gas-liquid contacting, in instances in which gas for the gas-liquid contacting is generated from the liquid, and the apparatus is for example being utilized as a regeneration unit. Thus, in such configuration, a second gas is not required to be introduced to the contacting zone being regenerated, from an external second gas source. Although process systems in various embodiments of the present disclosure may utilize a stripping gas such as steam that is externally sourced for regeneration of a contacting zone (rotating packed bed apparatus) being regenerated, other embodiments may utilize gas that is generated from the liquid, as a result of heat exchange producing volatilization of the liquid, as the gas for such purpose.

In other embodiments, however, the fluid flow passages of the above-described rotating packed bed apparatus may further comprise a gas inlet through which an influent gas can enter into the housing for the gas-liquid contacting therein.

It will therefore be appreciated that the above-described rotating packed bed apparatus may be configured in a wide variety of alternative manners, and may utilize any of the compatible features and elements variously described herein in the construction and operation of such apparatus.

Consistent with the foregoing, an additional aspect of the disclosure relates to a method of contacting gas with liquid for mass transfer therebetween, said method comprising introducing the liquid into a contacting zone containing at least one rotating mass of packing and at least one stationary heat exchanger, wherein each rotating mass of packing is adjacent to at least one stationary heat exchanger, contacting the introduced liquid with gas in the contacting zone, discharging contacted liquid from the contacting zone, and discharging contacted gas from the contacting zone. As previously described, gas for the contacting may be generated from the liquid. Alternatively, the method may comprise introducing the gas into the contacting zone.

In the contacting operations of the present disclosure, the liquid introduced to the contacting zone may be of any suitable type, and may for example comprise (i) an ionic liquid formed from the conjugate base of an acidic component having a pKa of less than about 15, and the conjugate acid of a nitrogenous base, (ii) a solution of a nitrogenous base having a nitrogen with a hydrogen atom leaving group, and a diluent, in which the nitrogenous base is reactive with an acidic gas to form a carbamate salt or a heteroatom analog of a carbamate salt, without substantial formation of a carbonate ester or a heteroatom analog of a carbonate ester, (iii) a solution of an ionic liquid consisting of a nucleophilic amine and a protic, non-aqueous liquid, in which the ionic liquid reacts with an acidic gas so as to form an ionic solution comprising: 1) a carbamate salt, zwitterionic sulfamic acid, sulfate salt, or a combination thereof; and 2) a protonated weak acid, (iv) an aqueous amine liquid composition, (v) a water-lean amine liquid composition, (vi) an enzymatic liquid composition, or (vii) other suitable liquid composition.

The packing in the at least one rotating mass of packing may likewise be of any suitable type and may for example comprise packing elements in the form of rings, grids, meshes, foams, blades, saddles, etc., of suitable construction and materials.

The contacting method as variously described above may be conducted, as involving processing of the contacted liquid discharged from the contacting zone to release therefrom one or more components deriving from the gas introduced to the contacting zone, and absorbed by the liquid in the gas-liquid contacting. Such one or more components deriving from the gas introduced to the contacting zone may for example comprise carbon dioxide, hydrogen sulfide, sulfur dioxide, nitrogen dioxide, carbon monoxide, or any other components of the source gas that require abatement.

The processing of the contacted liquid discharged from the contacting zone may comprise introducing the contacted liquid into a second contacting zone, to which second gas is introduced, with such second contacting zone containing at least one rotating mass of packing and at least one stationary heat exchanger, and wherein each rotating mass of packing is adjacent to at least one stationary heat exchanger in the second contacting zone. The resulting further-contacted liquid is discharged from the second contacting zone, and contacted second gas, containing the one or more components deriving from the contacted liquid from the first contacting zone that have been released from the contacted liquid to the second gas in the second contacting zone (e.g., the gas species described above), is likewise discharged from the second contacting zone. It is noted in this respect that a second gas is not required to be introduced to the contacting zone being regenerated, from an external second gas source. Although process systems in various embodiments may utilize a stripping gas such as steam that is externally sourced for regeneration of a contacting zone (rotating packed bed) being regenerated, other embodiments may utilize gas that is generated from the liquid, as a result of heat exchange producing volatilization of the liquid, as the gas for such purpose.

Thus, the method of the disclosure may be utilized to remove carbon dioxide from gas introduced to the contacting zone, such as flue gas from a power generating plant.

Figure 1:
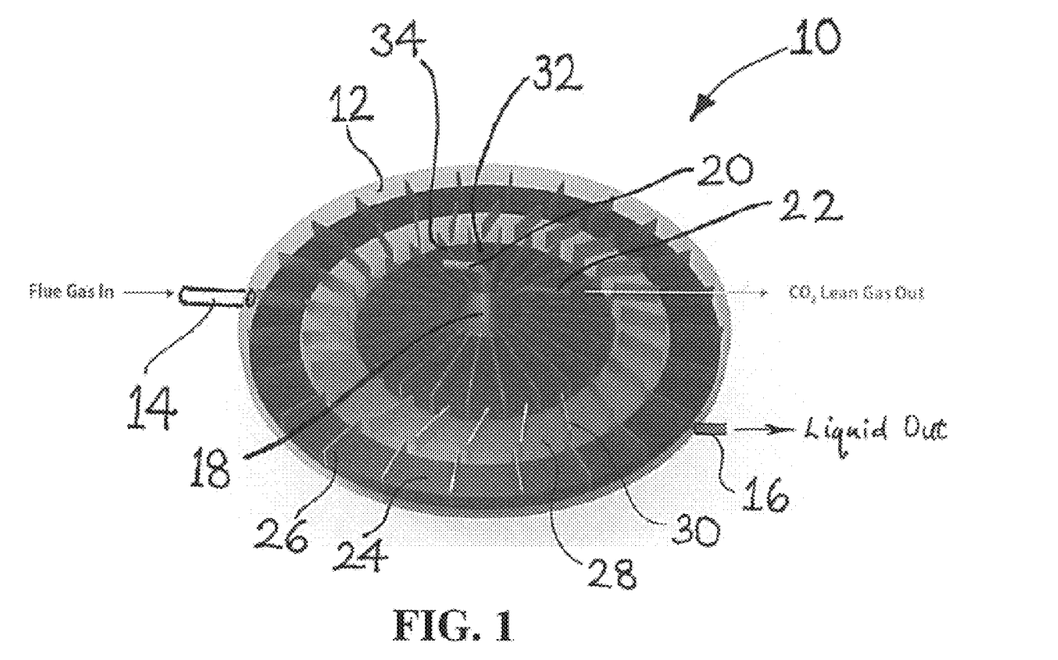
FIG. 1 is a schematic perspective representation of a rotating packed bed apparatus for gas-liquid contacting, according to one embodiment of the present disclosure.

Referring now to the drawings, FIG. 1 is a schematic perspective representation of a rotating packed bed apparatus 10 for gas-liquid contacting, according to one embodiment of the present disclosure. The apparatus includes a housing 12 comprising a cylindrical outer bounding wall. A gas inlet 14 is provided, secured to the cylindrical wall, through which an influent gas can enter an interior volume of the housing for gas-liquid contacting therein. A liquid outlet 16 is provided, secured to the housing, through which an effluent liquid can flow out of the interior volume of the housing after gas-liquid contacting therein.

The apparatus includes a central hub 18 as a structure into which gas inlet 20 extends, through which an influent gas can enter the interior volume of the housing for gas-liquid contacting therein. A gas outlet 22 also extends into the hub 18, so that effluent gas can flow out of the interior volume of the housing after gas-liquid contacting therein, through the gas outlet.

Mounted in the housing 12 for rotation therein is an inner rotor assembly 32 including a plurality of radially extending, circumferentially spaced apart vanes 34 for enhancing the intensity of the gas-liquid contacting operation, when the rotor assembly is rotated in the housing. The inner rotor assembly 32 comprises packing between the respective vanes 34, supporting the gas-liquid contacting. Thus, blade packing may be employed on the rotor. Structured packing may also be utilized on the rotor, and vane packing may be employed on the stator. It will be recognized that a wide variety of blade and vane augmentation may be employed, and a variety of packing elements may be utilized.

Radially outwardly from the inner rotor assembly 32 is a stator assembly 28 stationarily mounted in the housing, comprising at least one heat exchanger arranged to thermally modulate the gas-liquid contacting. The stator assembly 28 in like manner to the interior rotor assembly includes a series of circumferentially spaced-apart vanes 30, which are respectively angled in relation to the vanes 34 on the inner rotor assembly, and although stationary in character, serve to channel and intensify the gas-liquid contacting in cooperation with the vanes 34 on the inner rotor assembly 32 and the vanes 26 on the outer rotor assembly 24.

The outer rotor assembly 24 is constructed in a similar fashion to the inner rotor assembly 32, and comprises packing between the respective vanes 26, supporting the gas-liquid contacting.

The inner rotor assembly 32 and outer rotor assembly 24 are concurrently rotated in the operation of the apparatus 10, and for such purpose may be mounted on a floor or platform (not shown in FIG. 1) for simultaneous rotation by a drive motor or mechanism suitably coupled to the floor or platform on which the respective rotor assemblies 24 and 32 are mounted, while the intermediate stator assembly 28 is maintained stationary. The stationary character of stator assembly 28 may be accommodated by appropriate mounting of such assembly in the interior volume of the housing. For example, the stator assembly 28 on its lower extremity may be provided with roller bearings or other cooperative structure accommodating rotation of the aforementioned floor or platform while the stator assembly itself is maintained in a fixed and immovable state.

In operation, gas is introduced in gas inlet 14 to the interior volume of the housing 12, while at the same time liquid is introduced to the interior volume in liquid inlet 20, with inner rotor assembly 32 and outer rotor assembly 24 being concurrently rotated, resulting in corresponding rotation of the vanes 34 and 26 on such rotor assemblies, while stator assembly 28 remains in a stationary state. The rotational movement of the respective inner and outer rotor assemblies imparts centrifugal force on the liquid introduced from liquid inlet 20, so that the liquid is distributed on the packing in the rotor assemblies, and with the heat exchanger in the stator assembly serving to thermally modulate the gas-liquid contacting, e.g., to compensate for the heat of adsorption as gas components for which the liquid is absorbingly effective are taken up in the liquid, when the apparatus is operated in gas scrubbing mode.

The heat exchanger in the stator assembly may be operated to provide heating or cooling thermal modulation in various modes of operation of the apparatus. Since the stator assembly contains one or more heat exchangers, and the stator assembly is stationary in character, flow circuitry may be readily coupled with the heat exchange unit(s) in the stator assembly in a safe and effective manner, as compared to a form of the apparatus in which the stator assembly instead of being stationary is of rotational character. Any such rotational character would therefore introduce severe heat exchange fluid containment constraints, with seals, couplings, and fittings required to accommodate the movement of the heat exchanger in the course of operation.

In such respect, the gas-liquid contacting apparatus of the general type shown in FIG. 1 achieves high efficiency, and ease of operation and design, with respect to heat exchange unit(s) of the stator assembly being coupled to sources of heat exchange fluids by associated flow circuitry, without issues associated with rotational movement if the heat exchange unit(s) were otherwise in rotational movement in the operation of the apparatus. Other arrangements are possible. As a variation of the rotating packed bed apparatus shown in FIG. 1, the gas inlet 46 and gas outlet 52 may be reversed in function, so as to constitute the rotating packed bed apparatus as including a gas inlet 52 and a gas outlet 46. As previously described, other functional arrangements may be employed, to effectuate cross-flow contacting of gas and liquid, or other gas-liquid contacting flow arrangements, in which the positions of respective inlets and outlets are varied from the arrangement that is shown in FIG. 1.

Figure 2:
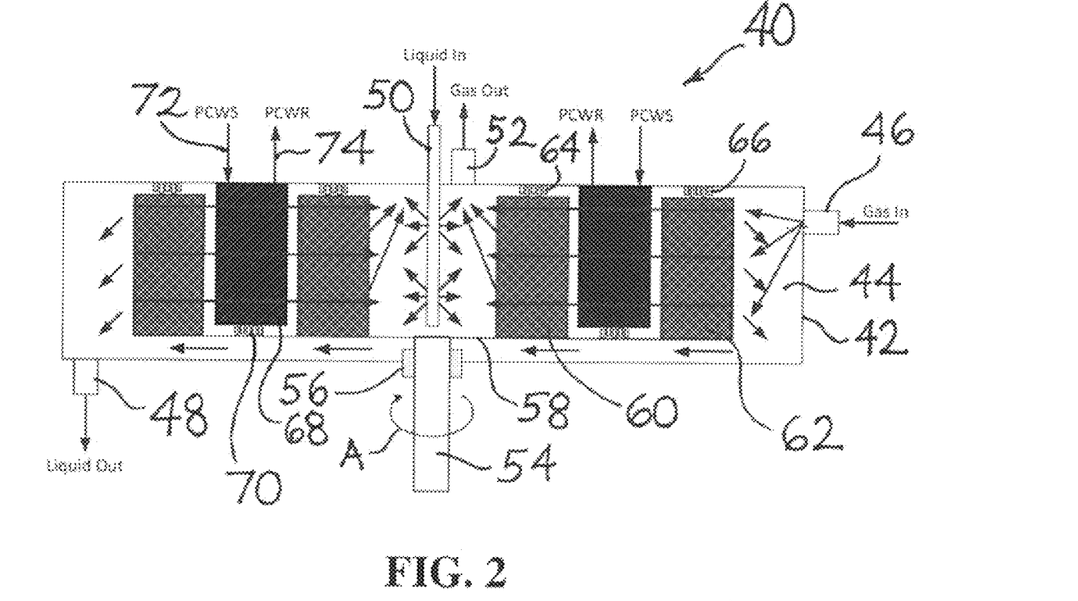
FIG. 2 is a schematic cross-sectional elevation view of a rotating packed bed apparatus for gas-liquid contacting, according to another embodiment of the disclosure, as employed to scrub a gas for removal of one or more components therefrom.

FIG. 2 is a schematic cross-sectional elevation view of a rotating packed bed apparatus 40 for gas-liquid contacting, according to another embodiment of the disclosure, as employed to scrub a gas for removal of one or more components therefrom.

As illustrated, the apparatus 40 includes a housing 42 defining an interior volume 44 therewithin. A gas inlet 46 is provided at the bounding sidewall of the housing, and a liquid outlet 48 is provided in the floor of the housing.

Extending centrally upwardly through the floor of the housing, and mounted in bearing 56, is a drive shaft 54. The drive shaft 54 is coupled with a suitable motive driver (not shown) such as a motor, drivetrain, gearing, or other suitable device or assembly for imparting rotation to the shaft in the direction indicated by arrow A. The drive shaft 54 at its upper end in the interior volume 44 of the housing is secured to a platform 58 which upon rotation of the drive shaft is correspondingly driven in the direction A of rotation of the shaft. Mounted on the platform 58 is an inner cylindrical rotor assembly 60 engaging a top bearing 64 mounted on the underside of the top wall of the housing, and an outer cylindrical rotor assembly 62 engaging a top bearing 66 mounted on the underside of the top wall of the housing, whereby the respective rotor assemblies 60 and 62 are conjointly rotated upon rotation of the platform 58 on which they are mounted. In place of the top bearing 66, an appropriate sealing element, such as a labyrinth-type seal, may be employed to seal between the stationary and rotating components. Sealing elements may likewise be used in lieu of bearings in other locations of the rotating packed bed apparatus of the present disclosure, as may be appropriate or otherwise desirable in given implementations of the apparatus and method of the present disclosure Extending through the top wall of the housing in the central region thereof is a liquid inlet 50, which downwardly depends into the interior volume. The liquid inlet within the interior volume of the housing is perforated along its length, whereby introduced liquid is dispensed into the interior volume of the housing, as illustrated. A gas outlet 52 also is coupled to the top wall of the housing, for discharge of contacted gas from the interior volume 44 of the housing.

Mounted to the stationary top wall of the housing (the entire housing being stationary in character) is a cylindrical stator assembly 68 comprising a heat exchanger that is coupled with process cooling water supply (PCWS) line 72 and process cooling water return (PCWR) line 74, lines 72 and 74 forming a heat exchange fluid flow circuitry that is coupled with a source of cooling water for circulatory flow of the cooling water heat exchange fluid through the heat exchanger of the stator assembly 68. The stator assembly engages on its lower surface with a bearing 70 mounted on the platform and accommodating rotational platform movement. By such arrangement, the heat fluid flow circuitry is effective to circulate cooling water through the heat exchanger in the stator assembly 68 to effect cooling of the fluids in the interior volume 44 of the housing 42, thereby maintaining the fluids at appropriate temperature for absorption by the liquid of the absorbable components in the gas introduced to the interior volume from the inlet 46.

In operation, the liquid introduced in inlet 50 will be dispersed into the gas in the interior volume and the impingement of the liquid on the packing in the rotor assemblies 60 and 62 will provide interfacial surface area of the liquid exposed to the gas, so that the gas is scrubbed effectively by the liquid. The contacted gas, depleted in the absorbable component, then is discharged from the housing in outlet 52, with the contacted liquid containing the absorbed component being discharged in outlet 48.

Figure 3:
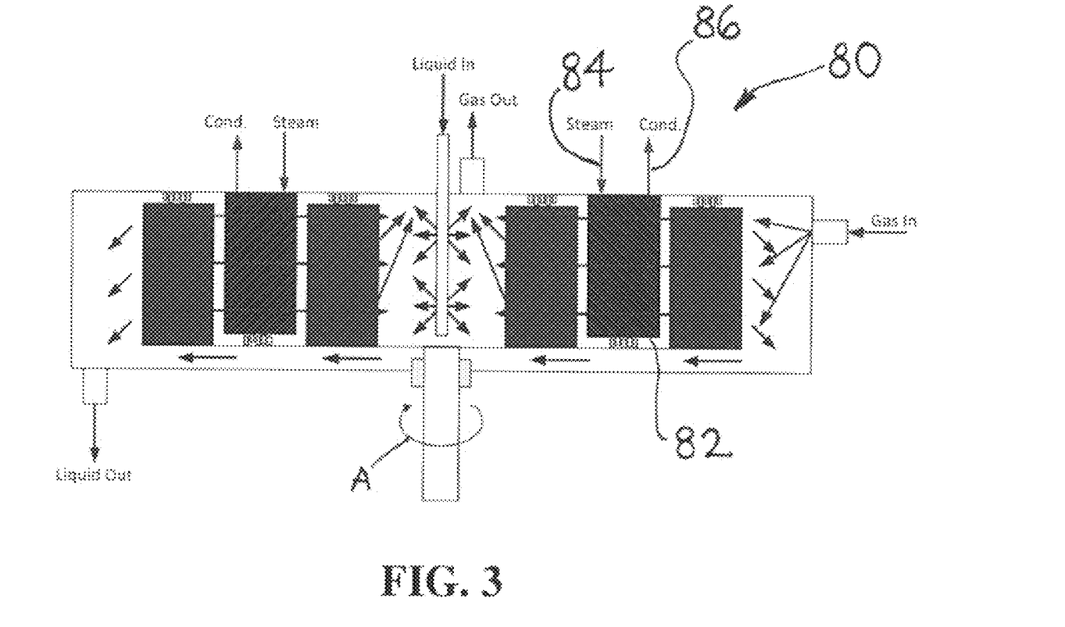
FIG. 3 is a schematic cross-sectional elevation view of a rotating packed bed apparatus for gas-liquid contacting, according to a further embodiment of the disclosure, as employed to remove one or more components from a liquid.

FIG. 3 is a schematic cross-sectional elevation view of a rotating packed bed apparatus 80 for gas-liquid contacting, according to a further embodiment of the disclosure, as employed to remove one or more components from a liquid.

The apparatus of FIG. 3 is configured correspondingly to that of FIG. 2, with the exception that the heat exchange fluid flow circuitry associated with the stator assembly 82 comprises a steam inlet line 84 and a condensate return line 86, all other parts and elements of the FIG. 3 apparatus corresponding to those of the FIG. 2 apparatus. The FIG. 3 apparatus thereby is configured for gas-liquid contacting to effect removal of one or more components of the liquid by the gas with which the liquid is contacted.

Accordingly, the steam introduced in steam inlet line 84 produces heating of the fluids in the interior volume of the apparatus, so that the one or more components of the liquid desired to be removed are volatilized and entrained in the contacting gas, thereby producing a liquid depleted in the one or more components, which is discharged from the housing in the liquid outlet, and a gas enriched in such one or more components, which is discharged from the housing in the gas outlet.

It will therefore be apparent that an apparatus of the type shown in FIG. 2 may be coupled with an apparatus of the type shown in FIG. 3, to provide an installation in which gas may be scrubbed in a first one of the apparatus units, and the resulting liquid enriched in the removed component(s) may be regenerated in the second one of the apparatus units. Installations of such type are further discussed hereinafter.

Figure 4:
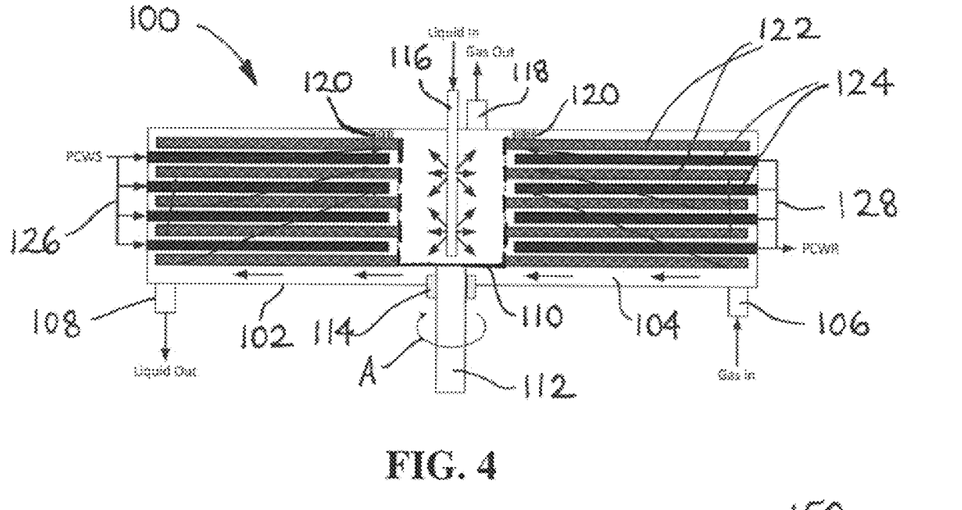
FIG. 4 is a schematic cross-sectional elevation view of a rotating packed bed apparatus for gas-liquid contacting, according to a further embodiment of the disclosure.

FIG. 4 is a schematic cross-sectional elevation view of a rotating packed bed apparatus 100 for gas-liquid contacting, according to a further embodiment of the disclosure.

In this apparatus 100, a housing 102 encloses an interior volume 104 in which is disposed a rotatable vessel 110 with its bottom surface joined to the drive shaft 112 extending through the floor of the housing in bearing 114. The drive shaft 112 is joined to a suitable motive driver (not shown) effective to rotate the drive shaft in the direction indicated by arrow A. Joined to the side wall of the rotatable vessel 110 is a series of vertically spaced-apart rotor assemblies 122, each of disk-shape, so that the rotor assemblies 122 rotate with the rotatable vessel 110 when driven by the drive shaft 112.

Interleaved and alternating with the individual ones of the disk-shaped rotor assemblies is a series of correspondingly disk-shaped stator assemblies 124 comprising one or more heat exchangers. The disk-shaped stator assemblies 124 are secured at their outer edge to the side wall of the housing 102, with each of such stator assemblies being coupled to heat exchange fluid flow circuitry including process cooling water supply (PCWS) supply manifold 126 having branches communicating with each of the stator assemblies, and process cooling water return (PCWR) manifold 128 having branches communicating with each of the stator assemblies.

Mounted to an underside of the top wall of the housing 102 is a roller bearing 120 to accommodate rotation of the rotor assemblies 122. The rotatable vessel 110 has openings along its length to accommodate fluid flow in contact with the stator assemblies containing heat exchanger(s). Liquid is introduced into the rotatable vessel 110 in liquid inlet 116, and contacted gas is discharged from the housing in gas outlet 118. Contacting gas is introduced into the interior volume 104 of housing 102 in gas inlet 106, and contacted liquid resulting from the gas-liquid contacting in the apparatus is discharged from the housing 102 in liquid outlet 108.

By this arrangement, the apparatus 100 is configured for scrubbing of influent gas by the influent liquid, in the interior volume 104 of the housing, with discharge of the resulting scrubbable components-depleted gas from the apparatus, and discharge of the resulting scrubbed components-containing liquid from the apparatus.

Figure 5:
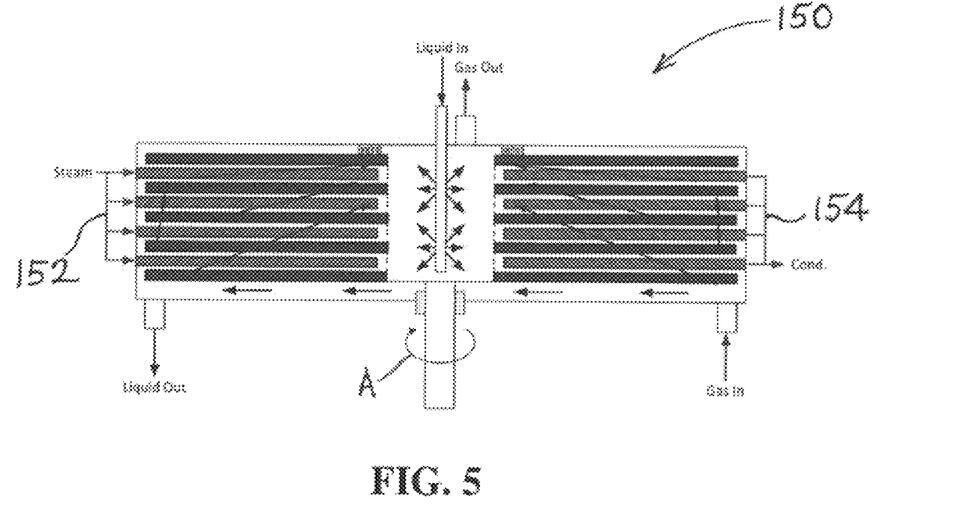
FIG. 5 is a schematic cross-sectional elevation view of a rotating packed bed apparatus for gas-liquid contacting, according to a yet another embodiment of the disclosure.

FIG. 5 is a schematic cross-sectional elevation view of a rotating packed bed apparatus 150 for gas-liquid contacting, according to a yet another embodiment of the disclosure. The structure and operation of the apparatus of FIG. 5 is the same as that of the FIG. 4 apparatus, except that the FIG. 5 apparatus is configured with a steam supply manifold 152 and condensate return manifold 154 in its flow circuitry, rather than the cooling water feed and return flow manifolds in the flow circuitry of the apparatus in FIG. 4.

Accordingly, the apparatus 150 may be employed to remove one or more components from a feed liquid introduced into the interior volume of the apparatus for contacting with gas introduced to the interior volume, with the resulting contacted gas containing the removed components being discharged in the gas outlet of the apparatus, and with the resulting contacted liquid being discharged in the liquid outlet of the apparatus. The steam flowed through the stator assembly heat exchangers serves to heat the liquid to increase the vapor pressure and volatility of the removable components of the liquid, so that they are volatilized into the contacting gas.

Figure 6:
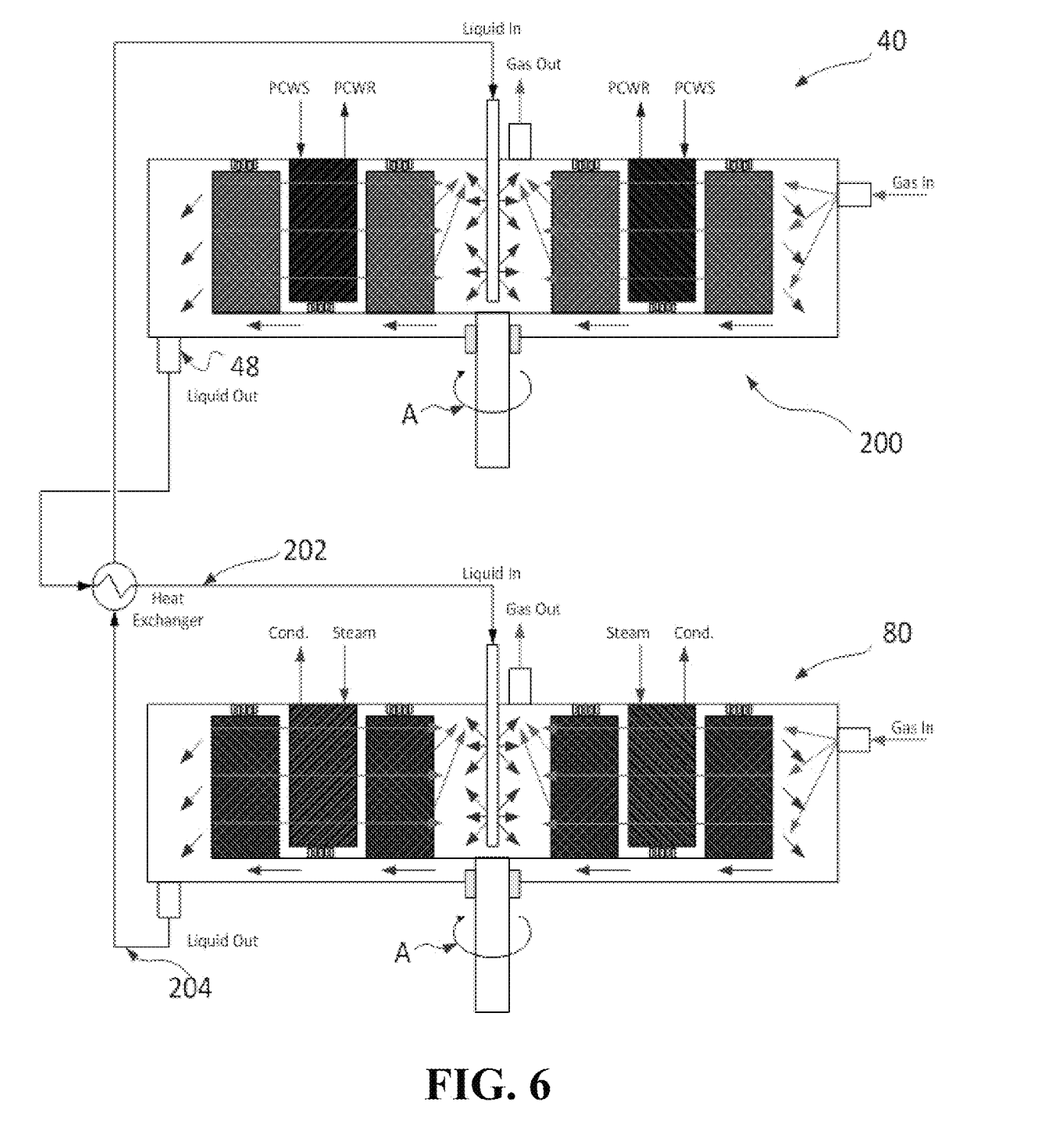
FIG. 6 is a schematic cross-sectional elevation view of an installation of multiple rotating packed bed apparatus units, in which a first unit effects scrubbing of a gas by a liquid that then is regenerated in a second unit of the installation.

FIG. 6 is a schematic cross-sectional elevation view of an installation 200 of multiple rotating packed bed apparatus units, in which a first unit 40 corresponding to the apparatus as shown in FIG. 2 herein effects scrubbing of a gas by a liquid that then is regenerated in the installation in a second unit 80 corresponding to the apparatus shown in FIG. 3 herein. For such purpose, the liquid outlet 48 of the first unit 40 is coupled by liquid transfer line 202 to the liquid inlet of the second unit 80, and the regenerated liquid from the second unit 80, depleted in scrubbed component(s), is discharged from the second unit 80 in liquid outlet line 204 thereof. Also illustratively shown in FIG. 6 is a heat exchanger ("Heat Exchanger") that is schematically depicted as being in flow contact with the liquid inlet and outlet streams of the first unit 40 as well as the liquid outlet stream of the second unit 80. It will be appreciated that the arrangement shown in FIG. 6 is of an illustrative character only, and that specific heat exchange arrangements and relationships in various embodiments may be widely varied in the broad practice of the present disclosure, to accommodate heat exchange between any two or more fluid streams in the overall installation that are amenable to such heat exchange relationship, and/or heat exchange involving any one or more of such fluid streams with an externally supplied heating or cooling medium.

Figure 7:
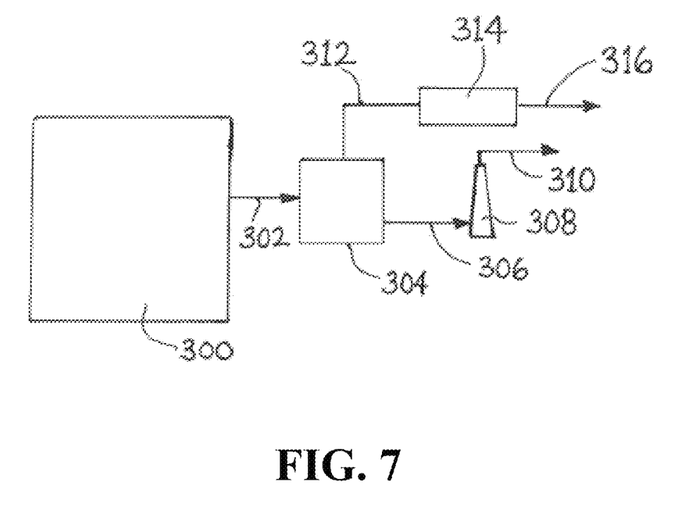
FIG. 7 is a schematic representation of a power plant system, in which a fueled power plant generates a $CO_2$-containing flue gas that is processed in a rotating packed bed apparatus of the disclosure, to yield captured $CO_2$ product and $CO_2$-depleted stack gas.

FIG. 7 is a schematic representation of a power plant system, in which a fueled power plant 300 generates a $CO_2$-containing flue gas that is processed in a rotating packed bed apparatus installation 304 constructed in accordance with the present disclosure, being flowed from the power plant 300 to the rotating packed bed apparatus 304 in effluent feed line 302. The rotating packed bed apparatus effects removal of $CO_2$ from the $CO_2$-containing flue gas to produce $CO_2$-depleted gas that is flowed in line 306 to stack 308 for discharge as $CO_2$-depleted stack gas in discharge line 310.

The scrubbing liquid containing the absorbed $CO_2$ then is processed in the rotating packed bed apparatus installation 304 to release $CO_2$ from the scrubbing liquid to produce a raw $CO_2$ gas that is flowed in line 312 to the compression and purification unit 314 to yield a final $CO_2$ product discharged from the compression and purification unit 314 in line 316, from which the final $CO_2$ product may be packaged or otherwise processed for use, or alternatively fixed for sequestration in a fixant medium.

It will therefore be apparent that rotating packed bed apparatus and installations of the present disclosure may be utilized for $CO_2$ capture from gas streams containing same as well as for a wide variety of other effluent abatement and gas processing applications, such as for example natural gas sweetening, pre-combustion $CO_2/SO_2$ capture, syngas processing for chemical production. It will likewise be recognized that the rotating packed bed apparatus and installations of the present disclosure provide a substantial improvement over systems employing packed absorption towers and stripping columns, achieving a substantial reduction in size, footprint, and capital and operating expenses.

While illustrative embodiments have been described herein, wherein multiple rotating packed bed apparatus units have been utilized in combination in corresponding installations, it will be recognized that more generally, rotating packed bed apparatus units of the present disclosure may be singly or multiply deployed in combination with process equipment other than rotating packed bed apparatus. For example, rotating packed bed apparatus unit(s) of the present disclosure may be used in combination with other types of absorption and/or regeneration apparatus, and/or with other fluid processing equipment of widely varied types, in the broad practice of the present disclosure.

Accordingly, while the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A method of contacting gas with liquid for mass transfer therebetween, said method comprising introducing the liquid into a contacting zone containing at least one rotating mass of packing and at least one stationary heat exchanger, wherein each rotating mass of packing is adjacent to at least one stationary heat exchanger, contacting the introduced liquid with gas in the contacting zone, discharging contacted liquid from the contacting zone, and discharging contacted gas from the contacting zone,
    wherein each rotating mass of packing and each stationary heat exchanger is of annular shape in a concentric arrangement, or the at least one rotating mass of packing and the at least one stationary heat exchanger are in a stacked arrangement.

2. The method of claim 1, (i) wherein gas for the contacting is generated from the liquid, or (ii) further comprising introducing the gas into the contacting zone.

3. The method of claim 1, wherein:
    each rotating mass of packing and each stationary heat exchanger is of annular shape in a concentric arrangement, wherein each rotating mass of packing and each stationary heat exchanger comprises a plurality of radially outwardly extending, circumferentially spaced apart vanes, wherein the vanes on each rotating mass of packing are angled in relation to the vanes on each stationary heat exchanger.

4. The method of claim 1, wherein the contacting zone is bounded by a cylindrical outer wall circumferentially surrounding (i) an outermost one of the at least one rotating mass of packing and at least one stationary heat exchanger, when each of the at least one rotating mass of packing and at least one stationary heat exchanger is of annular shape in a concentric arrangement, or (ii) outermost edges of the at least one rotating mass of packing and at least one stationary heat exchanger, when the at least one rotating mass of packing and the at least one stationary heat exchanger are arranged in a stacked arrangement.

5. The method of claim 1, comprising one, or multiple compatible ones, of features (i)-(x):
    (i) the contacting zone contains multiple rotating masses of packing;
    (ii) the contacting zone contains one stationary heat exchanger;
    (iii) the contacting zone contains two rotating masses of packing, wherein said stationary heat exchanger is stationarily positioned between them;
    (iv) the contacting zone contains multiple stationary heat exchangers;
    (v) the contacting zone contains multiple rotating masses of packing and multiple stationary heat exchangers, in alternating arrangement with respect to one another;
    (vi) the at least one stationary heat exchanger effects heating for the gas-liquid contacting;
    (vii) the at least one stationary heat exchanger effects cooling for the gas-liquid contacting;
    (viii) the liquid is introduced into the contacting zone at a central region thereof;
    (ix) the contacted gas is discharged from the contacting zone at a central region thereof;
    (x) the liquid is introduced into the contacting zone, and the contacted gas is discharged from the contacting zone, at a central region of the contacting zone, spaced apart from one another.

6. The method of claim 1, wherein the liquid introduced to the contacting zone comprises:
    an ionic liquid formed from the conjugate base of an acidic component having a pKa of less than about 15, and the conjugate acid of a nitrogenous base;
    a solution of a nitrogenous base having a nitrogen with a hydrogen atom leaving group, and a diluent, in which the nitrogenous base is reactive with an acidic gas to form a carbamate salt or a heteroatom analog of a carbamate salt, without substantial formation of a carbonate ester or a heteroatom analog of a carbonate ester;
    a solution of an ionic liquid consisting of a nucleophilic amine and a protic, non-aqueous liquid, in which the ionic liquid reacts with an acidic gas so as to form an ionic solution comprising: 1) a carbamate salt, Zwitterionic sulfamic acid, sulfate salt, or a combination thereof; and 2) a protonated weak acid; or
    an aqueous amine liquid composition, a water-lean amine liquid composition, or an enzymatic liquid composition.

7. The method of claim 1, further comprising:
    introducing the gas into the contacting zone; and
    processing the contacted liquid discharged from the contacting zone to release therefrom one or more components deriving from the gas introduced to the contacting zone, and absorbed by the liquid in the gas-liquid contacting.

8. The method of claim 7, wherein said processing comprises introducing the contacted liquid into a second contacting zone, to which second gas is introduced, said second contacting zone containing at least one rotating mass of packing and at least one stationary heat exchanger, wherein each rotating mass of packing is adjacent to at least one stationary heat exchanger in the second contacting zone, and wherein each rotating mass of packing and each stationary heat exchanger in the second contacting zone is of annular shape in a concentric arrangement, or the at least one of the rotating mass of packing and the at least one heat exchanger in the second contacting zone are in a stacked arrangement, discharging further-contacted liquid from the second contacting zone, and discharging contacted second gas, containing said one or more components, from the second contacting zone.

9. The method of claim 1, further comprising:
introducing the gas into the contacting zone, wherein the gas contains carbon dioxide, and the method is performed to remove carbon dioxide from the gas.

10. The method of claim 1, wherein each rotating mass of packing and each stationary heat exchanger is of annular shape in a concentric arrangement.

11. The method of claim 1, wherein each rotating mass of packing and each stationary heat exchanger is of annular shape in a concentric arrangement, and the contacting zone comprises a housing including a floor, a top wall and a circumscribing sidewall, defining an interior volume in which each rotating mass of packing is mounted on a platform that is rotated to rotate each rotating mass of packing mounted thereon, with each rotating mass of packing engaging a bearing mounted on an underside of the top wall of the housing, and each stationary heat exchanger mounted to the underside of the top wall of the housing and engaging a bearing mounted on the platform and accommodating rotational platform movement.

12. The method of claim 11, wherein the concentric arrangement comprises an inner rotating mass of packing, an outer rotating mass of packing, and a stationary heat exchanger therebetween.

13. The method of claim 12, wherein the gas contacted in the contacting zone is a $CO_2$-containing combustion effluent gas, and the introduced liquid is absorptive of $CO_2$ from the $CO_2$-containing combustion effluent gas.

14. The method of claim 1, wherein each rotating mass of packing and each stationary heat exchanger is of disk shape in a stacked arrangement.

15. The method of claim 14, wherein the stacked arrangement comprises multiple rotating masses of packing and multiple stationary heat exchangers.

16. The method of claim 15, wherein each rotating mass of packing and each stationary heat exchanger are in alternating relationship in the stacked arrangement.

17. The method of claim 16, wherein the contacting zone comprises a housing including a floor, a top wall and a circumscribing sidewall, defining an interior volume with the stacked arrangement of alternating ones of the rotating masses of packing and stationary heat exchangers therein, the interior volume having disposed therein a rotatable vessel including a sidewall to which each of the multiple rotating masses of packing is joined to rotate with the rotatable vessel, with each of the multiple stationary heat exchangers being secured to the wall of the housing.

18. The method of claim 17, wherein the gas contacted in the contacting zone is a $CO_2$-containing combustion effluent gas, and the introduced liquid is absorptive of $CO_2$ from the $CO_2$-containing combustion effluent gas.

\* \* \* \* \*